Aug. 11, 1964   J. A. KOHN   3,143,897
GEAR MECHANISMS AND METHOD OF MAKING THE SAME
Filed May 29, 1962   5 Sheets-Sheet 1

Inventor:
Julius A. Kohn,
by H.F. Manbeck Jr.
Attorney.

Aug. 11, 1964  J. A. KOHN  3,143,897
GEAR MECHANISMS AND METHOD OF MAKING THE SAME
Filed May 29, 1962  5 Sheets-Sheet 3

Inventor:
Julius A. Kohn,
by H. F. Manbeck, Jr.
Attorney.

Aug. 11, 1964      J. A. KOHN      3,143,897
GEAR MECHANISMS AND METHOD OF MAKING THE SAME
Filed May 29, 1962      5 Sheets-Sheet 5

Inventor:
Julius A. Kohn,
by H. F. Manbeck Jr.
Attorney.

United States Patent Office 3,143,897
Patented Aug. 11, 1964

3,143,897
GEAR MECHANISMS AND METHOD OF MAKING THE SAME
Julius A. Kohn, Waldwick, N.J., assignor to General Electric Company, a corporation of New York
Filed May 29, 1962, Ser. No. 198,638
15 Claims. (Cl. 74—606)

My invention relates to gear mechanisms such as gear reducers and gear motors and to methods for making such equipment.

For satisfactory operation of a gear mechanism it is, of course, necessary that the gears and the shafts carrying the gears be positioned in proper alignment. If the gears and the shafts are misaligned, wearing or binding of the gears and the shaft bearings may occur perhaps resulting in premature failure of the mechanism. Alignment has traditionally been obtained through the use of machined surfaces held to close tolerances. For example, in units where the shaft or the shaft bearings are mounted directly on the main frame or housing, the mounting surfaces may be reamed or bored to place them in exact alignment. And in units where there are detachable end shields carrying the shaft bearings, rabbeted surfaces turned to exact dimensions are ordinarily provided between the housing and the end shields, also to insure proper positioning of the shaft bearings. Whatever the construction, the machining operations must be done carefully to obtain the close tolerances required and the housing parts themselves must be relatively heavy and expensive castings so that they are suitable for machining. Thus, the use of machined surfaces for gear and shaft alignment is both time consuming in the manufacturing process and adds to the cost of the finished unit. Also, even a minor error in the machining operations may result in enough mis-alignment to cause wearing or binding in the mechanism.

Therefore, it is an object of my invention to provide a new and improved gear mechanism which does not incorporate machined surfaces, or the like, for gear and shaft alignment.

Another object of my invention is to provide a new and improved method of manufacturing a gear mechanism, which method provides proper gear and shaft alignment in the finished unit without the use of machined surfaces.

A further object of my invention is to provide an improved gear motor in which the housing is formed of inexpensive sheet metal parts rather than the traditional cast iron parts.

Still another object of my invention is to provide an improved method of making a gear motor in which the gears and shafts are first placed in very precise alignment and are then permanently fixed in the aligned position.

My invention also has as its object the provision of an improved construction and method of manufacture for gear mechanisms, which results in a high quality but yet relatively inexpensive unit in which the gears and shafts are permanently fixed in accurate alignment.

In carrying out my invention in one form thereof and particularly as applied to gear motors, I provide a gear motor which incorporates its electric drive motor as an integral part thereof. The drive motor includes a shaft and at least one end shield which mounts a bearing for supporting the shaft. An open ended gear casing, preferably formed of sheet metal, is secured to the motor end shield and the motor shaft extends into the gear casing through its side wall. A drive gear is formed or mounted on the motor shaft within the gear casing, and an output shaft is disposed so that an output gear carried by it meshes with the drive gear on the motor shaft. By my invention the output gear is mounted in close alignment with the drive gear and the gear casing closed by means of an improved arrangement which does not require nay machined surfaces or the like. This improved arrangement comprises end covers which carry the bearings for the output shaft and a combined securement and seal for the end covers consisting of a layer of hardened adhesive material disposed between each end cover and the gear casing. The layers of adhesive material firmly secure the end covers to the casing and at the same time prevent leakage of lubricant between the end covers and the casing. The output gear is aligned with the drive gear and the bearings properly positioned on the output shaft before the adhesive layers are hardened and therefore the need for machined surfaces and heavy cast parts is completely eliminated.

The above described gear motor, as well as other embodiments of my invention, may be advantageously manufactured by means of an improved method forming another important aspect of my invention. In this method of manufacture the drive gear and shaft, i.e., the motor shaft in the case of a gear motor, are first arranged on a predetermined axis with the drive gear disposed in the open ended gear casing. Then the output gear and shaft are placed in the casing with the output shaft extending out of the casing through at least one open end thereof. The output gear is properly aligned with the drive gear as the drive shaft is held on the aforesaid predetermined axis, and the open end or ends of the casing are then closed by the end covers, with an unhardened layer of adhesive being applied between the end covers and the casing. The bearings carried by the end covers are assembled on the output shaft as the end covers are added, and the output shaft and the end covers are adjusted to place the output gear in proper meshing relation with the drive gear and to give proper end clearances between the bearings and the output gear. Then the adhesive layers are hardened while the output gear and the end covers are held in their adjusted positions. When the adhesive layers are hardened, the assembly of the gear mechanism is completed, and all the parts are located and maintained in their proper positions without any machining operations whatsoever being required.

The subject matter which I regard as my invention is particularly pointed out and distinctly claimed in the concluding portion of this specification. My invention, however, together with further objects and advantages thereof, may best be understood by reference to the following description taken in conjunction with the accompanying drawings in which:

Figures 1, 2:
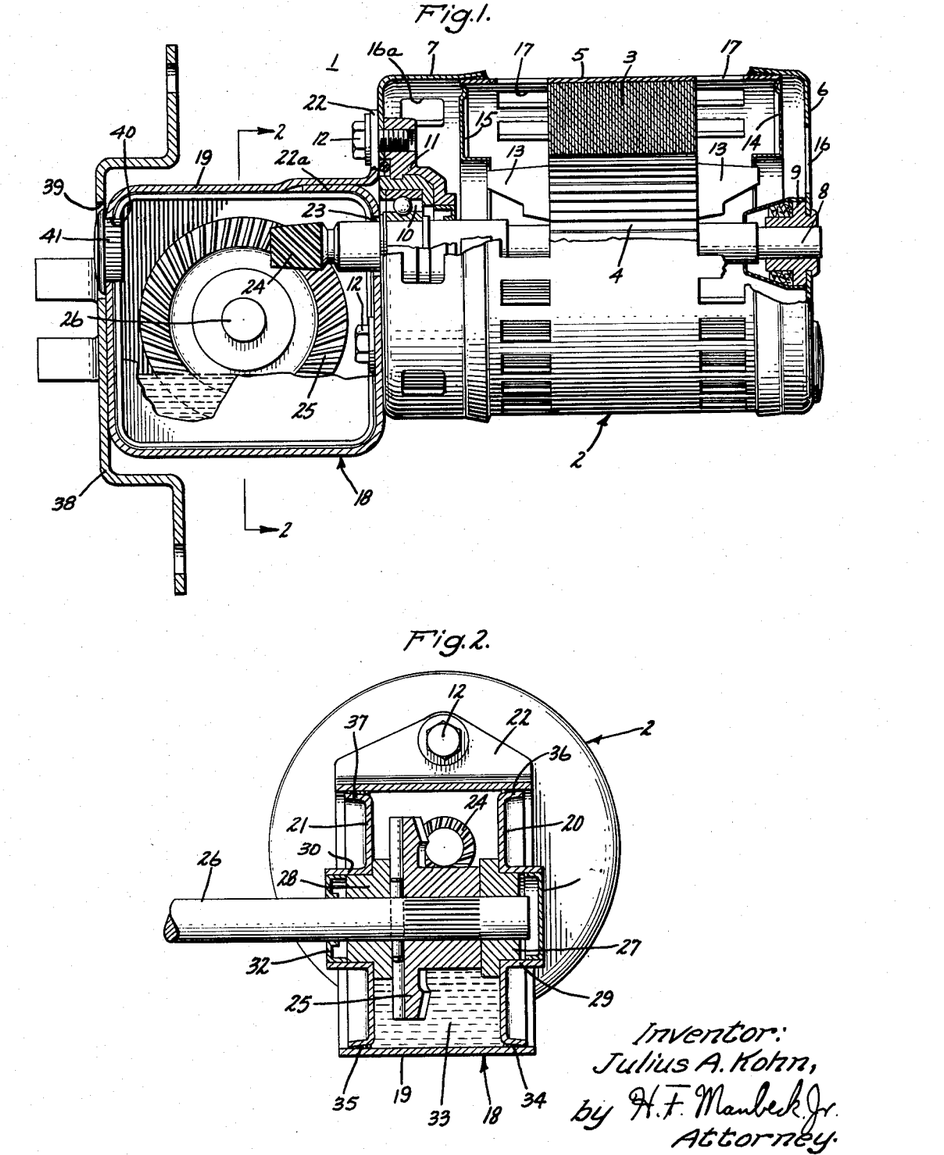
FIG. 1 is a side view, partially in section, of an improved gear motor embodying my invention in one form thereof.
FIG. 2 is a cross sectional view of the gear motor taken on the line 2—2 of FIG. 1.
Figures 3, 9:
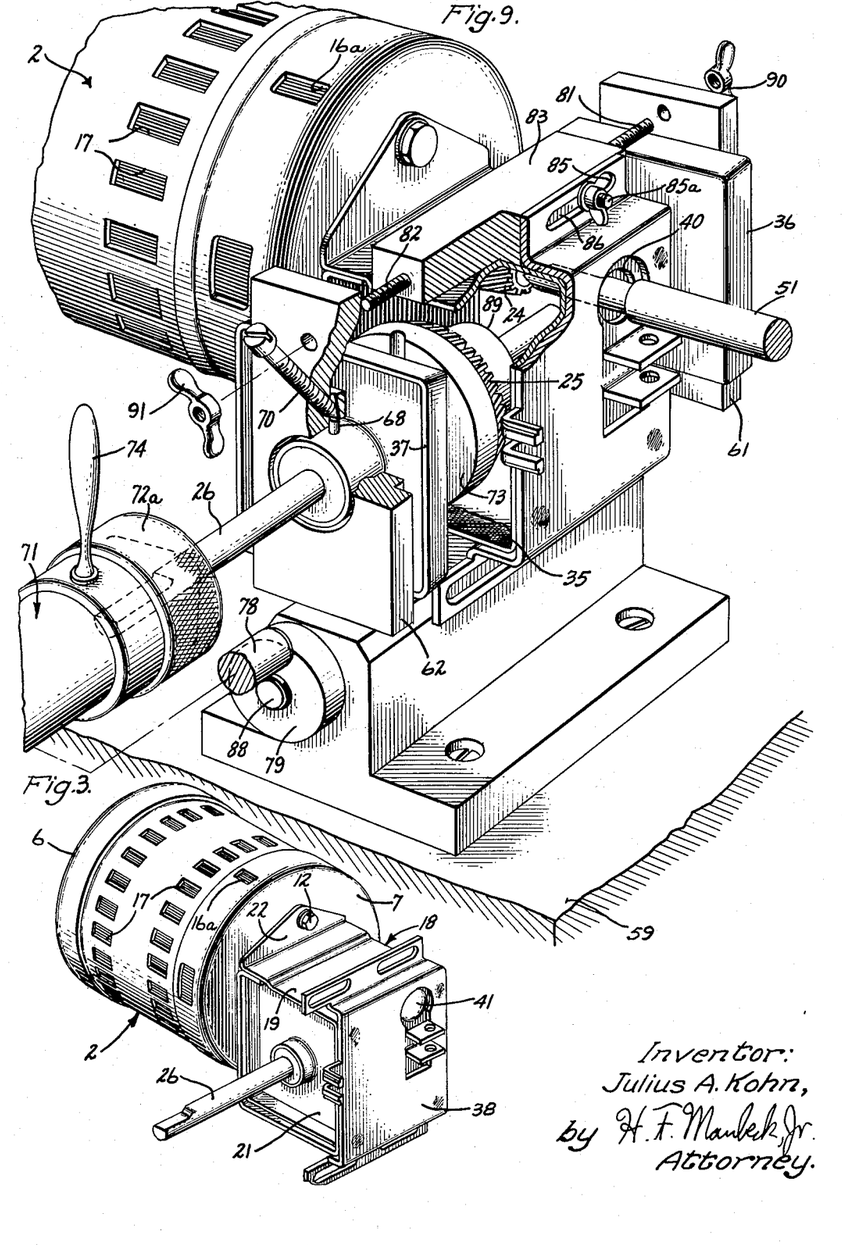
FIG. 3 is a perspective view further illustrating the gear motor.
FIG. 9 is a perspective view, partially broken away, illustrating the addition of the gear parts as the motor portion is held in the assembly fixture.

Referring now to FIGS. 1, 2 and 3, I have shown therein a new and improved gear motor which embodies my invention in one preferred form thereof. The gear motor 1 includes a motor 2 having a stator 3 and a rotor 4. The stator 3 is held by means of an outer steel shell 5 and the shell 5 in turn carries end shields 6 and 7 which mount end bearings for the shaft 8. Specifically, a sleeve bearing 9 is supported by the end shield 6 and a roller bearing 10 is carried by the end shield 7. It will be seen that the bearing 9 is attached directly to the end shield 6 whereas the bearing 10 is supported by a mounting ring 11 which in turn is attached to the end shield 7 by means of suitable bolts 12. The rotor 4 is, of course, carried by the shaft 8 between the two bearings 9 and 10 and it will be noted that integral fan blades 13 are cast on the rotor end rings to aid in cooling the motor during operation. Baffles 14 and 15 are provided at opposite ends of the shell 5 to aid in controlling the air flow set up by the fans, and suitable openings such as those indicated at 16, 16a and 17 are provided for the passage of cooling air through the motor. The air is drawn into the motor through the openings 16, 16a, passed over the ends of the stator including the end turns of the winding and exhausted through the openings 17. It will be understood, however, that my invention as applied to a gear motor is by no means limited to an open type motor wherein air is circulated for cooling but rather that such a motor is shown by way of example only.

Referring specifically to FIG. 1, it will be noted that the motor shaft 8 extends through both bearings 9 and 10 so that it is accessible at both ends of the motor. On the right side of the motor, the shaft terminates adjacent to the end of the bearing 9 but on the left side of the motor, it projects through the bearing 10 and the end shield 7 into a gear casing 18. The casing 18 comprises an open ended shell 19 formed of sheet metal which is closed at its opposite ends by means of a pair of end covers or shields 20 and 21. (See FIG. 2.) The shell 19 is in effect a four-sided rectangular member and it is secured to the end shield 7 by the same bolts 12 which hold the bearing mounting ring 11 in place. Two of the bolts 12 pass through suitable openings provided in the right side wall of the shell 19 (as viewed in FIG. 1) while a third extends through a flange 22 provided on the shell. It will be noted that adjacent the flange 22, there is an overlap 22a provided in the shell. A suitable glue or other sealant is provided between the surfaces at this overlap in order to seal the shell against the escape of lubricant.

The motor shaft 8 extends into the housing member or shell 19 through an opening 23 provided in the right side wall and formed on the shaft within the casing is a suitable pinion or drive gear 24. In the illustrated embodiment, the pinion 24 is cut on the motor shaft itself, but it will be understood that a separate gear or pinion could be mounted on the shaft by any suitable means, for example, by a press fit or keying, without departing from the invention. The gear 24 meshes with a driven gear or wheel 25 which is carried by the output shaft 26 of the gear motor. The shaft 26 is supported by a pair of bearings 27 and 28 which in turn are supported by the end shields 20 and 21. It will be noted that the bearings 27 and 28 are held by cylindrical flanges 29 and 30 formed on the end covers and that suitable lubricant seals are mounted by these flanges outwardly of the bearings. Specifically, a cap or seal 31 is mounted by the right end cover 20, and a member 32 which provides a running seal with the shaft 26 is mounted by the left hand cover 21. The gear 25 runs in a pool of oil or other lubricant as indicated at 33 whereby such covers or seals are necessary.

By my invention, the end covers 20 and 21 are mounted to the main housing member or shell 19 in such a way that no machined surfaces whatsoever are required in the gear casing. Specifically, each end cover is secured to the shell 19 by means of a structural layer of non-shrinking adhesive material. Specifically, the end cover 20 is attached to shell 19 by the adhesive layer 34 while the end cover 21 is attached to the shell by the adhesive layer 35. The thickness of these layers is exaggerated in the drawings (FIGS. 2 and 11) for purposes of illustration, but it will be understood that the adhesive layers extend completely around the periphery of the end covers between them and the shell 19 and permanently and fixedly attach the end covers to the shell. The structural adhesive layers 34 and 35 in addition to holding the end covers in place also form lubricant seals between them and the shell 19, whereby the layers act both as a securement and as a sealing means. To assure sufficient bonding for both these purposes, the end covers are provided with peripheral flanges such as indicated at 36 and 37 so that the adhesive layers may extend for some distance between the end covers and the outer shell.

My improved method of assembling the gear motor 1 will be explained hereinafter in detail but for present purposes, it will be understood that the gears 24 and 25 are placed in perfect alignment with the bearings 27, 28 and the end covers 20, 21 being positioned by the output shaft 26, and that then the adhesive layers 34 and 35 are hardened so as to permanently fix the end covers and bearings in that position. With this arrangement whereby the adhesive layers or holding means are cured after the gears are placed in alignment, there is no need whatsoever for any machined surfaces in the gear housing. Instead, the alignment is obtained by fitting the gears together in the correct relationship, with the end covers and bearings then necessarily being aligned by the output shaft itself, and the adhesive layers 34 and 35 when cured permanently maintain this aligned relationship.

I prefer to use a thermo-setting resinous material to form the adhesive layers 34 and 35. In particular, in the preferred embodiment of my invention, I have used an epoxy resin to form the layers 34 and 35. This resin, for example, may be the commercially available resin #643 produced by the Rubber and Asbestos Corporation of Bloomfield, N.J., with a suitable hardener added, such as the hardener CH–1 of the Rubber and Asbestos Corporation. It will be understood that my invention is not limited to any particular material for the layers 34 and 35 but it is essential that the material have certain characteristics. In particular, it must be basically non-shrinking, both during curing and after it is cured. In addition, it must not soften or weaken under the heat, vibration and other shocks to which it is subjected during the operation of the gear motor. And also it must not be subject to attack by the lubricant 33 placed within the gear case. In other words, the resinous or other adhesive material must be non-shrinking relative to the metal casing parts so that it does not change the alignment of the gears, and also it must be resistant to any heat, moisture, shock or other conditions to which it is subjected during service so that it will continue to maintain the alignment and sealing of the end covers indefinitely.

It will be noted from FIGS. 1 and 3 that a mounting bracket 38 may be secured to the side of the gear casing opposite the motor 2. The addition of the mounting bracket is, of course, optional, but it will be noted that it and the shell 19 include aligned apertures 39 and 40.

These apertures provide for the addition of the lubricant to the gear casing 18 after the end covers have been secured in place, and a cap 41 is provided for closing the aperture 39 in the gear casing during service. The apertures 39 and 40 also allow access to the interior of the gear case during the assembly process and the manner in which they are so employed will be explained below in detail.

Figures 7, 8, 12:
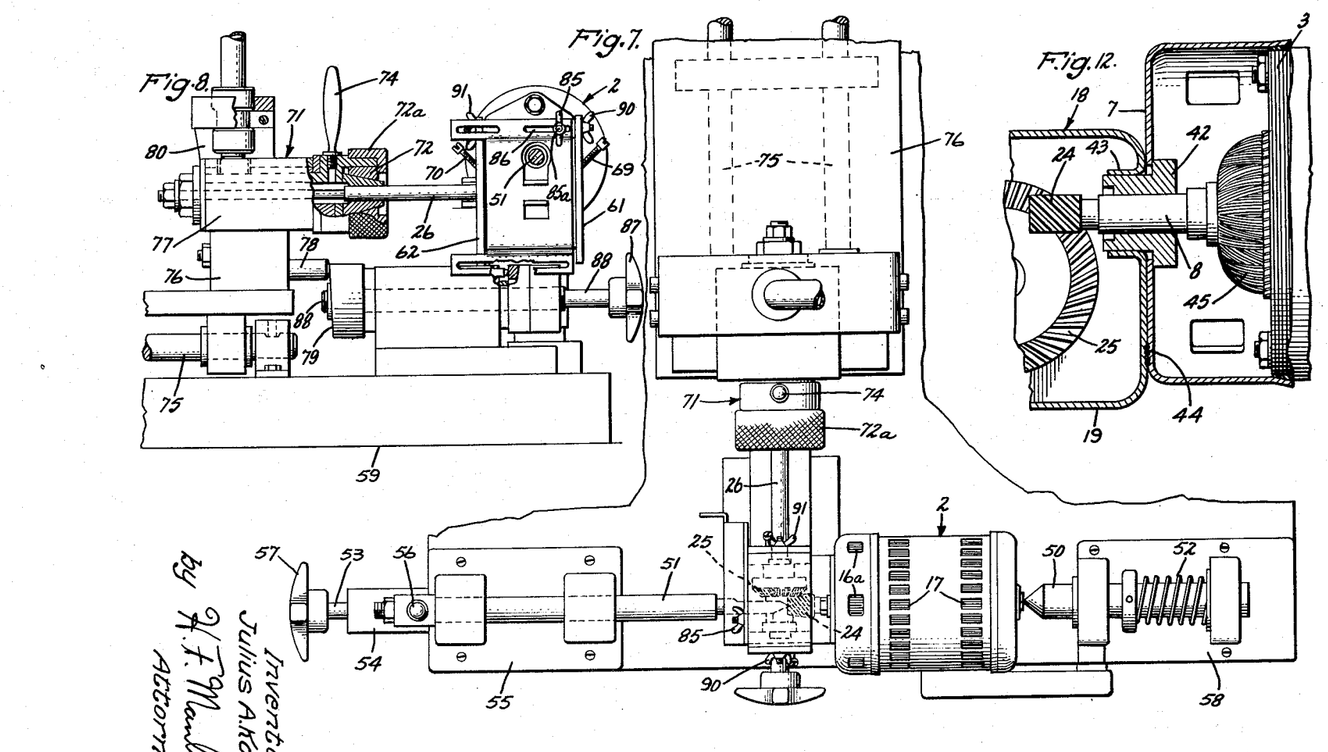
FIG. 7 is a top view showing the assembly fixture of FIG. 6 with the gear parts assembled to the motor portion.
FIG. 8 is a front elevational view of the assembly fixture with the motor portion of the gear motor held therein and the gear parts clamped in place.
FIG. 12 is a fragmentary view, partially in section, illustrating an alternate embodiment of a gear motor embodying my invention.

Before explaining the method of assembling the gear mechanism, I will refer to FIG. 12 wherein there is shown an alternate arrangement of my improved gear motor. In FIG. 12 like parts are indicated by the same numbers as in FIGS. 1–3. In FIG. 12, the motor shaft 8 extends into the gear casing 18 and carries a pinion 24 on its outer end in the same manner as in FIGS. 1–3. It will be noted, however, that the gear end bearing for the motor shaft is supported by both the motor end shield 7 and the gear case shell 19. Specifically, a sleeve bearing 42 is provided and this bearing is accommodated at its left-hand end by a flange 43 formed on the gear case shell 19 while at its right-hand end, a flange on the bearing itself engages the end shield 7. The gear shell in this embodiment is rigidly attached to the end shield 7 as by spot welds 44 and thereby the gear case and end shield together provide a rigid support for the bearing 42. It will, of course, be understood that other bearing arrangements may be used for the motor shaft and that both this arrangement and the arrangement of FIG. 1 are shown by way of example only.

It will also be noted that the embodiment of FIG. 12 has a somewhat different type of motor than FIG. 1. Specifically, FIG. 12 employs a series or universal type motor having a wound rotor 45 instead of an induction type rotor, such as the rotor 4 of FIG. 1. Also, in FIG. 12 the end shields are attached directly to the stator 3 instead of to a shell 5 disposed around the stator. The type and details of the motors may of course vary in other respects from those illustrated without departing from my invention as it relates to the construction and arrangement of the gear mechanism of the gear motors.

Figure 4:
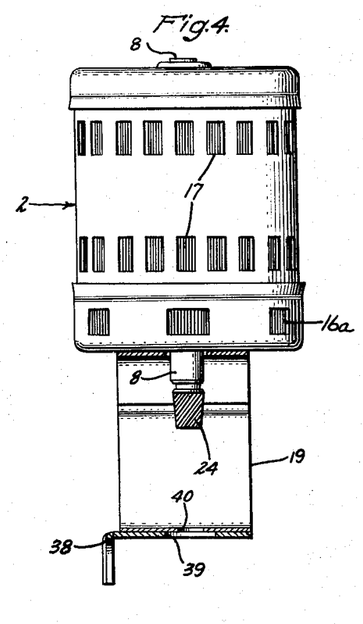
FIG. 4 is a top view of the motor portion of the gear motor with the gear case attached and ready for the assembly of the gear portion, the gear case being shown in section.
Figure 5:
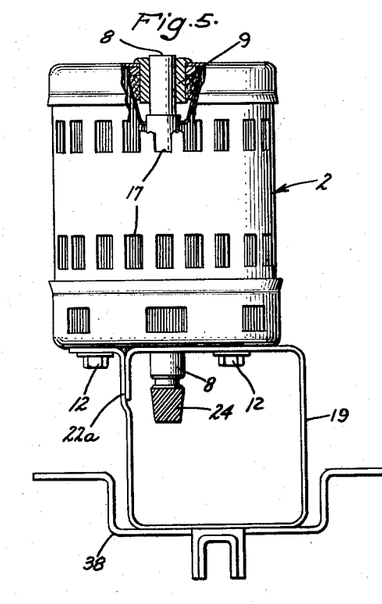
FIG. 5 is a side view further illustrating the motor portion with the gear case attached.

Referring to FIGS. 4–12, I will explain my new and improved method for assembling the gear mechanism of the gear motor 1. Referring first to FIGS. 4 and 5, these drawings illustrate the initial step in the method of assembly. Specifically, they show the motor portion 2 of the gear motor with the gear casing shell 19 secured thereto. In the gear motor 1, the shell 19 is secured to the end shield 7 of the motor by bolts 12 but as pointed out with regard to the embodiment of FIG. 12, other means such as welding may be employed to secure the shell 19 to the end shield. The motor shaft 8 and the pinion 24 of course project into the shell 19 and it will be noted that the openings 39, 40 in the mounting bracket 38 and the shell 19 are disposed directly opposite the end of the pinion 24. It will also be noted that the other end of the shaft 8 is also exposed since it extends outwardly through the bearing 9 to the upper end of the motor (as viewed in FIG. 5).

Figure 6:
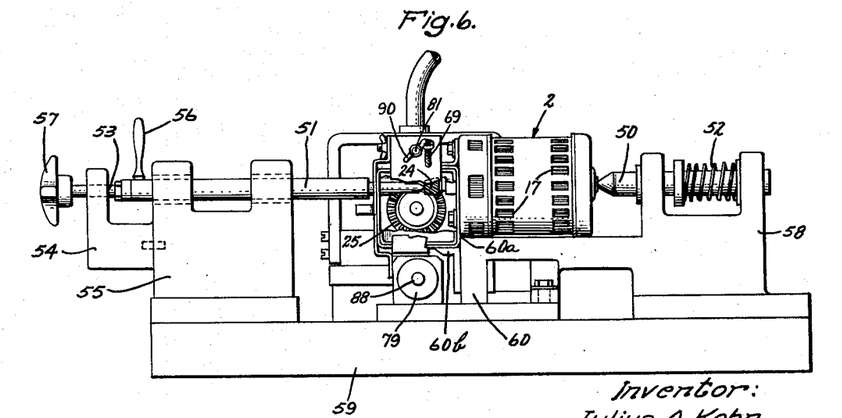
FIG. 6 is a side view showing the motor portion of the gear motor held in an assembly fixture for building the gear portion of the unit.

With the gear shell 19 attached to the end shield 7, the next step in my method is to arrange the motor 2 and the shell 19 so that the motor shaft 8 and the pinion 24 are held in a predetermined axis. This is done in my preferred method by engaging the motor shaft at its opposite ends by mounting means which are located on a predetermined axis. Specifically, these mounting or holding means engage the shaft 8 at its center at its opposite ends so that the shaft is held at shaft centers. This may best be seen by reference to FIGS. 6 and 7. As there shown, the motor and gear shell 19 are placed in a fixture which has a pair of movable pins 50 and 51 disposed on a horizontal axis. The pin 50 engages the right-hand end of the motor shaft 8 at shaft center, while the left-hand pin engages the left-hand or pinion end of the shaft also at shaft center. It will be noted that the pin 50 is biased to the left by means of a strong biasing spring 52 and thereby once the engagement of the pins is made with the motor shaft, the shaft will be securely held on the predetermined or horizontal axis. The pin 51 is inserted through the holes 39, 40 in the mounting bracket and gear casing and it is for that reason that they must be directly opposite the pinion as before mentioned. Once the pin 51 is engaged with the pinion end of the motor shaft, it is locked in place by means of a threaded locking member 53 (FIG. 6) which is carried by a pivoted arm 54 on the bracket 55. Specifically, once the pin 51 has been moved into engagement with the pinion by means of the handle 56, the bracket 54 is then swung up as illustrated in FIG. 6 so that the shaft 53 is disposed directly behind the pin 51. The shaft 53 is then turned by means of a hand wheel 57 until it engages the pin 51 and locks it in position. As before mentioned, the spring 52 insures that the motor shaft is securely held after the pin 51 is locked.

The pins 50 and 51 are preferably pointed at their inner ends where they engage the shaft, thereby to cause a point contact to be made with the shaft at shaft centers. Also, a small conical recess is preferably drilled at shaft center on each end when the shaft 8 is formed, to aid in causing the pointed ends of the pins 50, 51 to engage the shaft at exactly shaft centers. The engagement of the pins 50, 51 at shaft centers at both ends of the motor shaft insures that it is held on the exact horizontal axis desired. The pins may be supported by any suitable mounting bracket which will allow for their longitudinal movement on the desired axis and in that regard the pin 50 is shown as supported by the bracket 58 and the pin 51 by means of a bracket 55. Both brackets 55 and 58 are mounted by means of a supporting bench or table 59.

It will also be seen that means are provided to locate the position of the motor and gear shell assembly as the motor shaft is held by the pins 50, 51. Specifically, the lower right end of the gear shell (as viewed in FIG. 6) engages a stop or block 60 held by the table 59, so to determine the axial position of the motor and gear shell assembly. This contact between the shell 19 and the block is indicated at 60a. Also, a vertically movable locator 60b carried by block 60 engages the bottom surface of the shell 19 to hold the top and bottom surfaces of the gear shell parallel to the surface of table 59. The locator 60b is spring biased upwardly by suitable spring means (not shown) so it will positively engage the gear shell 19 to perform this leveling function.

Figure 10:
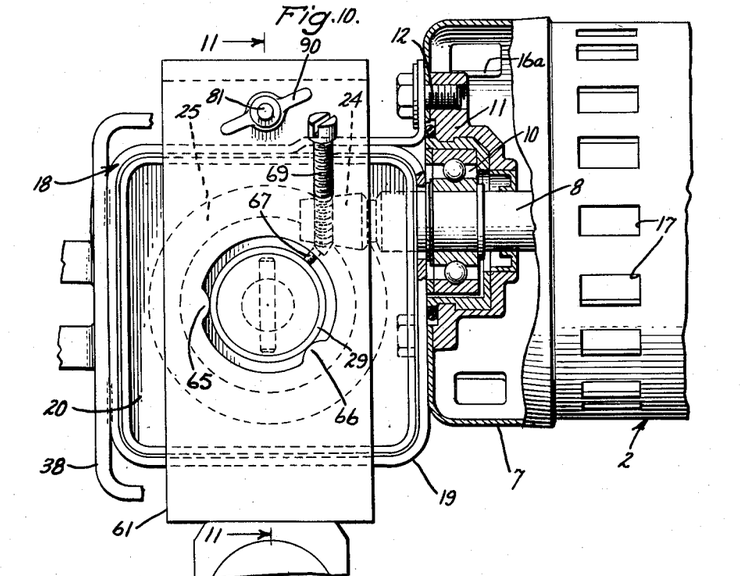
FIG. 10 is a fragmentary side view of the assembled gear motor illustrating the clamping means used to hold the gear covers during the curing step of the assembly process.
Figure 11:
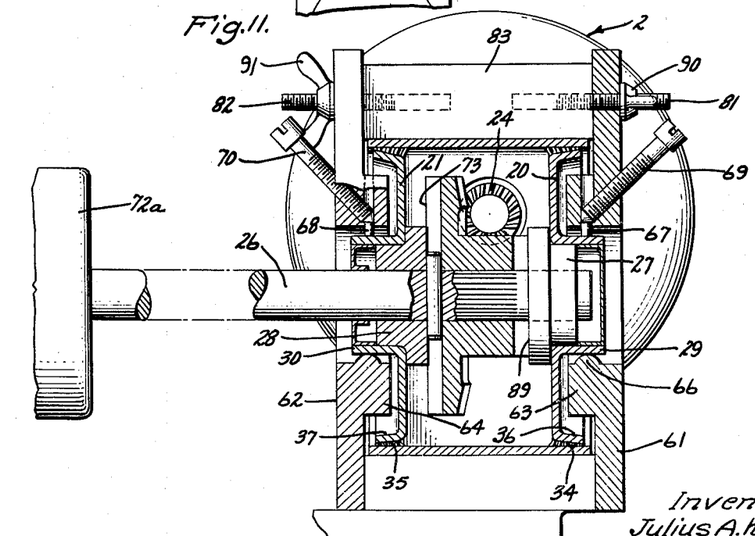
FIG. 11 is a sectional view taken on the line 11—11 of FIG. 10, further illustrating the clamping means for the covers.

With the motor shaft 8 held at shaft centers by the pins 50 and 51, the next step is to place the driven gear 25 and the end covers 20, 21 in position. The gear 25 is preassembled on the shaft 26 by any suitable means, as by a press fit, and thereby the addition of the gear 25 also places the shaft 26 in position. However, before either the gear or the end covers are added to the gear casing, the end covers are first provided with suitable cover clamps, such as the clamps 61, 62. These clamps are best seen in FIG. 11, and it will be noted that they are generally rectangular members and that they are each provided with a central flange that surrounds the respective flange 29 or 30 of the associated end covers. Specifically, the clamp 61 is provided with a flange 63 while the clamp 62 includes a flange 64. Each of these flanges is provided with a pair of inwardly extending bosses, the bosses 65 and 66 of the clamp 61 being seen in FIG. 10. Also mounted by the flange of each clamp is a radially movable pin, the clamp 61 having a pin 67 and the clamp member 62 having a like pin 68. These pins are movable inwardly by means of a screw 69 or 70, respectively. The screws 69, 70 engage the outer ends of the pins and as each pin is moved inwardly, it and the bosses on the flange of the clamp form a three-point contact between the clamp and the flange of the end cover to hold the clamp in place. Specifically, the cover 61 is held on the end cover 20 by means of the bosses 65, 66 and the pin 67, while the clamp 62 is held on the end cover 21 by means of a pair of like bosses (one of which is shown in FIG. 11), and the pin 68.

Either before or after the clamps 61, 62 are placed on the respective end covers 20, 21, a layer of uncured adhesive is applied at each end of the casing shell 19. Specifically, the layer 34 is applied at the right-hand end and the layer 35 is applied at the left-hand end, the layers extending completely around the interior perimeter of the shell. The layers of uncured adhesive as placed on the shell may be seen in both FIG. 9 and FIG. 11. The uncured layers of resin 34 and 35 after curing form the means for securing the end covers 20, 21 in place in the finished gear motor and therefore are identified by the same number as in FIG. 2.

With the cover clamps secured to the end cover and with the layers of adhesive applied to the interior of the shell 19, I am now ready to assemble the output gear and shaft and the end covers into the shell 19. In this assembly process, the output gear 25 must be properly aligned and adjusted relative to the pinion 24 and the end covers 20 and 21 must be properly positioned so that their bearings will maintain the gear 25 and the output shaft 26 in their correct position. The alignment of the output gear and shaft is obtained by means of a fixture 71 (FIGS. 7 and 8) which holds the output shaft 26 on a predetermined axis transverse to the axis of the motor shaft 8. Specifically, the fixture 71 holds the shaft 26 on a horizontal axis which is perpendicular to a vertical plane through the motor shaft and which is spaced downwardly from the axis of the motor shaft sufficiently that the teeth of the gear 25 will mesh properly with the teeth of the pinion 24. This spacing is, in particular, equal to the center distance of the gear and the pinion. The fixture 71 is movable in a horizontal plane so as to advance the gear 25 into the gear housing 19 and it includes means for securely holding the gear shaft 26. In the preferred embodiment, this means comprises a split chuck 72 which is locked onto the gear shaft 26 by means of a rotatable locking ring 72a. As shown in FIG. 8, the outer end of the shaft 26 is extended far enough into the chuck to assure that the motor shaft will be held on the exact axis desired when the chuck is tightened.

Before the gear shaft 26 is placed in the chuck, the end cover 21 and its clamp 62 are first positioned thereon. In other words, the end cover 21 and the clamp 62 are located on the output shaft 26 so that when the shaft is placed in the chuck 72, the cover and clamp are located between the chuck and the back face 73 of the output gear (FIG. 9). With the end cover 21 and clamp 62 in place and with the shaft locked in the chuck 72, the fixture 71 is then advanced, that is moved to the right as viewed in FIGS. 8 and 9, until the output gear 25 engages the pinion 24 (the manner in which the fixture is moved and the gears engaged being more fully explained below). Then the chuck 72 is rotated slightly by the handle 74 until the teeth of the output gear bottom are in the spaces between the teeth of the pinion 24. In other words, the fixture 71 is brought home and rotated so that the gear 25 is engaged with the pinion 24 but with no clearance therebetween. Since the motor shaft and pinion are held on one predetermined axis by the pins 50, 51 and since the output shaft and gear are held in a second predetermined axis by the fixture 71, perfect alignment of the two gears is obtained as the output gear 25 is seated.

It will be understood that the fixture 71 may be advanced by any suitable means either manual or automatic. In one arrangement, I prefer to use a pneumatically operated mechanism (not shown) for advancing the fixture on its ways 75 (FIGS. 7 and 8). Since the details of this mechanism form no part of the invention, it will not be described in detail herein. However, it will be understood that when the pneumatic mechanism is actuated, the fixture 71 is moved as a whole to the right on the ways 75. Specifically, the base 76 of the fixture moves on the ways 75 and carries with it the chuck 72 and its mount 77. The base 76 moves to the right until a pin 78 provided on it engages a face cam 79 located on the mounting table 59 of the fixture below the chuck 72. The purpose of this engagement with the cam 79 will be explained hereinafter in detail, and it will be noted that the output gear 25 engages the pinion 24 slightly before the pin 78 engages the cam 79 to limit the movement of the fixture. The mount 77 is movable axially on the base 76 and as the gear 25 engages the pinion 24, the mount 77 and the chuck 72 slide backward slightly on the base 76 against the force of a biasing spring (not shown). Then after the chuck 72 is rotated slightly to bottom the output gear teeth in the lands of the pinion as mentioned above, the mount 77 is locked to the base by a locking mechanism 80, which may also be pneumatically operated. It will, of course, be obvious that the movement and control of the chuck 72 could be accomplished manually and that the use of a pneumatic advancing and locking means comprises only an expedient useful in mass production.

With the gear 25 bottomed against the pinion 24, the covers 20 and 21 are now moved into position over the open end of the casing shell 19. Specifically, the cover 21 is pushed inwardly with its clamp 62 along the shaft 26, and the cover 20 with its clamp 61 is fitted over the other end of the cover (the right-hand end as viewed in the drawings) so that the bearing 27 carried by it fits over the right-hand end of the shaft. As will be more fully explained below, the cover 20 is put in place first and the cover 21 is later positioned after certain clearances are set for the gears. As the end covers and cover clamps are moved into position, suitable apertures provided in the upper ends of the cover clamps are fitted onto threaded studs 81 and 82 which are carried by a clamping block 83 that is positioned on the top of the shell 19. This arrangement may be readily seen by reference to FIGS. 9 and 11. The clamping block 83, it will be noted, is held in position by means of a wing nut 85 which is threaded on a stud 85a of the clamping block. This stud 85a extends through an elongated opening 86 in the bracket 38 attached to the shell 19 of the gear motor. The block 83 is preferably attached to the bracket before the motor and gear shell assembly are put in the fixture.

It will be noted that the flanges 36 and 37 of the end covers are inclined outwardly so that the space between them and the shell 19 is smaller at their outer ends than where they join the main body of the cover. Thus, as the end covers are pushed into place, the adhesive layers 34, 35 are squeezed to some degree so as to fill the space between the flanges 36, 37 and the shell 19.

Before the end covers 20 and 21 are put in the gear shell 19, the gear 25 and shaft 26 are indexed so as to set the backlash between the gear 25 and the pinion 24. This is done by means of the cam 79 which engages pin 78 of the fixture base 76. Before the pin 78 was engaged with the cam as the fixture was moved home, the cam was previously turned by means of its adjusting knob and shaft 87, 88 (FIG. 8) so that it allowed the greatest excursion possible of the fixture 71 to the right. Thus, as the cam is now turned by the knob 87 and shaft 88, it causes the fixture 71 and thereby the output gear and shaft to move to the left a predetermined amount. In other words, it introduces a predetermined spacing between the output gear 26 and the pinion 25. This introduces the proper clearance or backlash between the teeth of the output gear and the corresponding teeth of the pinion.

With the backlash thus introduced between the two gears, the end cover 20 and its clamp 61 are now put in the shell 19 and pushed to the left (as viewed in FIGS. 9 and 11) as far as possible until the bearing 27 carried by the end cover engages the right-hand face 89 of the gear 25. (See FIG. 11.) Before the cover 20 is pushed home, the camming screw 69 is loosened and thus the bearing 27 is free to align itself properly on the shaft 26 as it moves into position against the gear 25. With the cover 20 in position so that bearing 27 engages the gear 25, a wing nut 90 is then tightened on the stud 81 of the clamping block 83. Thereby the clamp 61 is locked in position against the block but since the clamp is free to tilt relative to cover 20, the alignment of the cover and bearing 27 on the shaft 26 is not disturbed. It will be seen that there is a small clearance between the clamp 61 and the shell 19 after the clamp is tightened to the block, whereby the shell does not interfere with the clamping action. Once the nut 90 is tightened, the screw 69 is retightened forcing pin 67 inwardly and thereby locking the clamp 61 once again firmly to the cover 20. This fixes the position of the end cover 20 relative to the shell 19 and does it without causing any cocking of the bearing 27 on the shaft 26. Since the clamp 61 is clamped to the mounting block 83 before it is secured to the end cover itself, the tightening of the wing nut 90 does not disturb the position of the bearing 27 on the shaft. Instead the tightening of the screw 69 merely secures the end cover to the now fixedly positioned cover clamp 61 with the arrangement of the bearing on the shaft 26 not being affected.

It will be noted that when the end cover 20 is thus arranged in the desired position, adhesive layer 34, which is still in its uncured condition, completely fills the space between the flange 36 of the cover and the adjacent surface of the housing shell 19. This may be clearly seen in FIG. 11 wherein the depth of the layer 34 is exaggerated for purposes of illustration.

Once the end cover 20 is positioned and the cover clamp 61 is secured to both it and the mounting block 83, the end or bearing clearance is then introduced into the unit. This is done by again turning the cam 79 so as to move the fixture 71, and thereby the gear 26, another predetermined distance to the left. The distance the gear is moved is selected so as to provide free running without excessive backlash. Once the cam 79 has been turned so as to introduce the end clearance, the cover 21 and its clamp 62 are then pushed home so that the bearing 28 engages the back face 73 of the gear. The clamping screw 70 of the cover clamp 62 is loosened before the end cover 21 and clamp 62 are pushed home and thus the clamp is free to find a position on the end cover without causing cocking of the bearing.

Once the end cover 21 has been pushed home carrying the clamp 62, the clamp 62 is then firmly secured to the clamping block 83, this being done by tightening a wing nut 91 on the stud 82 of the mounting block. Once the nut 91 is tightened so as to firmly secure the cover clamp 62 to the clamping block, the screw 70 is retightened, firmly securing the clamp to the end cover. As in the case of the other end cover 20, this method of clamping assures that the end cover 21 is held in the desired position without causing any cocking of the bearing 28 on the shaft 26. And again, the block extends outwardly past the end of the shell a slight amount leaving a space between the shell and the clamp 62 so that there is no interference therebetween. With the end cover moved to the adjusted position, it will be seen that the uncured adhesive layer 35 forms a continuous band around the periphery of the end cover filling the space between it and the shell 19. This may be clearly seen by reference to FIG. 11.

With both end covers now clamped in position and held by means of the mounting block 83 and the cover clamps 61 and 62, the assembly may be removed from the assembly fixture. Specifically, the chuck 72 is now opened and retracted so as to release the output shaft 26, and the pins 50 and 51 are withdrawn so as to release the motor shaft 8. The assembled gear motor with the end covers and shaft clamped in place by the mounting block 81 and the cover clamps 61, 62 is now placed in a suitable oven and the adhesive layers 34 and 35 are cured so as to fixedly and permanently secure the end covers to the gear casing in their adjusted position. Since the layers 34 and 35 are formed of a basically non-shrinking adhesive, the curing process does not introduce any change in the position of the cover members, but instead they are permanently attached to the gear casing in their aligned and adjusted position. Once the curing of the adhesive layers is completed, the cover clamps 61, 62 and the mounting block 83 are removed from the gear motor and it is then ready for service, once lubricant has been placed in the gear housing. The cured or hardened adhesive layers, as mentioned above, not only provide a permanent securement of the end covers to the shell 19 of the gear casing, but in addition, they provide a seal preventing the leakage of lubricant from the casing.

The lubricant is added to the gear casing, after it is completed, through the openings 39 and 40 in the mounting bracket and the gear shell 19 itself. Thus, these openings not only provide for a means of positioning the motor shaft during the assembly of the gear mechanism but also provide a means for adding lubricant to the gear box both initially and during service. As mentioned above, the opening 40 is closed by means of a suitable cap 41 after the lubricant is introduced into the gear case.

From the above it will be seen that I have provided a new and improved gear motor mechanism and method of making the same whereby the need for machined surfaces on the gear housing is completely eliminated. The gear parts are perfectly adjusted and aligned and held in that position by the structural adhesive layers located between the end covers and the casing shell. The parts are aligned and adjusted during assembly and are then permanently secured in that position when the adhesive layers are cured or hardened. The method of assembly wherein the motor shaft is held on a predetermined fixed axis and the gear parts are then introduced and clamped in place relative to the motor shaft insures that the exact alignment is obtained, and since the curing or hardening of the resin layers does not change the position of the end covers thereby the exact alignment obtained during assembly is assured during service. It will, of course, be understood that other means, for example, a C clamp, could be used to hold the end covers during the curing process, and that my invention in its broader aspects is not limited to the clamping means or the assembly fixture illustrated herein. Since the structural adhesive layers formed by the curing process also serve as lubricant seals, they thereby eliminate the need for O rings or other conventional sealing means in the finished unit. Also, since no machined surfaces are required, the housing parts themselves may be formed of sheet metal thereby further reducing the cost of the unit.

While in accordance with the patent statutes, I have illustrated what at present are considered to be the preferred embodiments and method of my invention, it will be understood that various changes and modifications may be made therein without departing from the invention and it is therefore aimed by the appended claims to cover all such equivalent variations as fall within the true spirit and scope of the invention.

What I claim as new and desire to secure by Letters Patent of the United States is:

1. The method of manufacturing a gear motor comprising, attaching an open ended gear casing to one end shield of an electric motor, with the motor shaft extending through a side wall of said casing into the interior thereof and carrying a pinion within said casing, placing an output gear and shaft in said casing with said output shaft extending out of said casing, placing end covers over the open ends of said casing with an unhardened adhesive being applied between said end covers and said casing, and assembling bearings carried by said end covers onto said output shaft, adjusting said end covers and said output gear to place said output gear into proper meshing relation with said pinion and with said bearings aligned by said output shaft, and hardening said adhesive while said end covers are held in the adjusted position, thereby to fix said end covers to said casing in the adjusted position and complete the assembly of said gear motor.

2. The method of manufacturing a gear mechanism comprising, mounting a first shaft in a gear casing which is open on at least one end thereof, with the first shaft carrying a first gear within said casing, placing a second gear and shaft in said casing with said second shaft extending out of said casing through an open end thereof, placing end cover means to close said casing, with an unhardened adhesive being applied between said end cover means and said casing, and assembling bearing means carried by said end cover means onto said second shaft, adjusting said end cover means and said second gear to place said second gear into proper meshing relation with said first gear, and hardening said adhesive while said end cover means is held in the adjusted position, thereby to fix said end cover means to said casing in the adjusted position and complete the assembly of said gear mechanism.

3. The method of manufacturing a gear motor comprising assembling an open ended gear casing to one end shield of an electric motor, with the motor shaft extending through a sidewall of said casing into the interior thereof and carrying a pinion within said casing, engaging said motor shaft with holding means at shaft center on both ends to support said motor shaft and said pinion on a predetermined axis, placing an output gear and shaft in said casing with said output shaft extending out of said casing on at least one end thereof, and with said output shaft held so that said output gear is properly aligned with said pinion as said input shaft is held on shaft centers, placing end covers over the open ends of said casing with an unhardened adhesive being applied between said end covers and said casing, and assembling bearings carried by said end covers onto said output shaft, adjusting said end covers and said output gear to set the backlash between said pinion and said output gear and the end clearance between said bearings and said output gear, clamping said end covers relative to said casing in their adjusted position, hardening said adhesive while said end covers are held in their adjusted positions thereby to fix said end covers to said casing and to complete the assembly of said gear mechanism, and thereafter removing the clamping means.

4. The method of claim 3 wherein the holding means for the motor shaft at the drive gear end is inserted through an opening in the side wall of the gear casing to engage said motor shaft at shaft center.

5. The method of manufacturing a gear mechanism comprising, mounting a first shaft in a gear casing which is open on at least one end thereof, with said first shaft carrying a first gear within said casing, engaging said first shaft with holding means to support said first shaft and gear on a predetermined axis, placing a second gear and shaft in said casing with said second shaft extending out of said casing through said open end, and with said second shaft held so that said second gear is properly aligned with said first gear as said first shaft is supported by said holding means, placing end cover means to close said casing with an unhardened adhesive disposed between said end cover means and said casing, and assembling bearing means carried by said end cover means on to said second shaft, adjusting said end cover means and said second gear to place said second gear into proper meshing relation with said first gear, and hardening said adhesive while said end cover means is held in the adjusted position.

6. The method of claim 5 wherein the holding means for the first shaft engage said shaft at shaft center on both ends, and are inserted through an opening in the wall of the gear casing to engage the first shaft at the gear end.

7. The method of manufacturing a gear mechanism comprising, arranging an input shaft in the wall of an open ended gear casing, with the input shaft carrying a drive gear within said casing, placing an output gear and shaft in said casing with said output gear engaging said drive gear and with said output shaft extending out of said casing on at least one end thereof, adjusting said output gear relative to said drive gear to set the backlash therebetween, placing end covers over the open ends of said casing with an unhardened adhesive being applied between said end covers and said casing, and assembling bearings carried by said end covers on the said output shaft, adjusting said end covers to maintain said backlash and to set the end clearance between said bearings and said output gear, and clamping said end covers to said casing in their adjusted position, hardening said adhesive while said end covers are clamped in their adjusted positions thereby to fix said end covers to said casing in said adjusted positions, and thereafter removing the clamping means.

8. The method of manufacturing a gear motor comprising, assembling an open ended gear casing to one end shield of an electric motor, with the motor shaft extending through a side wall of said casing into the interior thereof and carrying a drive gear within said casing, engaging said motor shaft with holding means on shaft center at both ends to support said motor shaft and said drive gear on a predetermined axis, the holding means for the motor shaft at the drive gear end being inserted through an opening in the side wall of the gear casing to engage said shaft at shaft center, placing an output gear and shaft in said casing with said output shaft extending out of said casing and with said output shaft held so that said output gear is properly aligned with said drive gear as said input shaft is held on shaft centers, adjusting said output gear relative to said drive shaft to set the backlash therebetween, placing end covers over the open ends of said casing, with an unhardened adhesive being applied between said end covers and said casing, adjusting said end covers to maintain said backlash and to set the end clearance between said bearings and said output gear, clamping said end covers to said casing in their adjusted positions, hardening said adhesive while said end covers are clamped in their adjusted positions, thereby to fix said end covers to said casing in said adjusted positions, and thereafter removing the clamping means.

9. The method of manufacturing a gear motor comprising, assembling an open ended gear casing to one end shield of an electric motor, with the motor shaft extending through a side wall of said casing into the interior thereof and carrying a drive gear within said casing, engaging said motor shaft with holding means at shaft center on both ends to support said motor shaft and said drive gear on a predetermined axis, placing an output gear and shaft in said casing with said output shaft extending out of said casing, and with said output gear properly aligned with said drive gear as said motor shaft is held on shaft centers, placing end covers over the open ends of said casing with an unhardened adhesive being applied between said end covers and said casing and assembling bearings carried by said end covers onto said output shaft, adjusting said end covers and said output shaft to place said output shaft in proper meshing relation with said pinion, hardening said adhesive while said end covers are held in their adjusted positions, thereby to fix said end covers to said casing and complete the assembly of said gear motor.

10. The method of claim 9 wherein the holding means for the motor shaft at the drive gear end is inserted through an opening in the side wall of the gear casing to engage said motor shaft at shaft center.

11. In a gear motor including an electric motor having a shaft and at least one end shield, an open ended gear casing secured to said one end shield, bearing means for supporting said motor shaft including a bearing mounted by said one end shield, a drive gear on said motor shaft within said casing, an output gear meshing with said drive gear, an output shaft carrying said output gear, and means closing the open ends of said casing and mounting bearings for supporting said output shaft, said means including end covers carrying said bearings and a layer of non-shrinking structural adhesive material disposed between unmachined surfaces of each end cover and said casing, the layers of adhesive material securing said end covers to said casing and acting as lubricant seals to prevent the leakage of lubricant between said end covers and said casing.

12. A gear mechanism comprising an open ended gear housing member formed of sheet metal, a first shaft disposed in said housing member and a first gear mounted on said shaft, a second shaft extending into said housing through one of the open ends thereof and extending transversely to said first shaft, said second shaft carrying a second gear meshing with said first gear, and means closing the open ends of said housing member and mounting bearings for supporting said second shaft, said means including end covers carrying said bearings and a layer of hardened structural adhesive material disposed between unmachined surfaces of each end cover and said casing, the layers of adhesive material securing said end covers to said casing and acting as lubricant seals to prevent the leakage of lubricant between said end covers and said casing, and said layers comprising the sole effective means performing the securing and sealing functions for said end covers.

13. In a gear motor including an electric motor having a shaft and shaft supporting means including at least one end shield, an open ended gear housing member formed of sheet metal and secured to said one end shield, said motor shaft extending through said end shield and the adjacent wall of said housing member into the interior of said housing member and having a supporting bearing means mounted at least in part by said end shield, a pinion on said motor shaft within said housing member, an output shaft extending transversely to said motor shaft and carrying an output gear meshing with said pinion, and means closing the open ends of said casing and mounting bearings for supporting said output shaft, said means including end covers carrying said bearings and a layer of hardened adhesive material disposed between unmachined surfaces of each end cover and said casing, the layers of adhesive material securing said end covers to said casing and acting as lubricant seals to prevent the leakage of lubricant between said end covers and said casing.

14. The gear motor of claim 13 wherein said housing member includes an opening in its side wall opposite the end of said motor shaft whereby said motor shaft may be engaged by holding means during the assembly of said gear motor.

15. A gear mechanism comprising a gear housing member open on at least one end thereof, a first shaft disposed within said housing member and a first gear mounted on said shaft, a second shaft extending into said housing member through an open end thereof and carrying a second gear meshing with said first gear, and means closing said housing member and supporting bearing means for said second shaft, said means comprising end cover means carrying said bearing means and a layer of hardened adhesive material disposed between unmachined surfaces of said end cover means and said housing member, said layer of adhesive material securing said end cover means to said casing and acting as a lubricant seal between said end cover means and said casing.

References Cited in the file of this patent

UNITED STATES PATENTS

| | | |
|---|---|---|
| 2,423,869 | Blessing | July 15, 1947 |
| 2,542,158 | Soderberg | Feb. 20, 1951 |
| 2,966,068 | Christian | Dec. 27, 1960 |
| 3,043,147 | Will | July 10, 1962 |